United States Patent [19]

Ross

[11] 4,335,996
[45] Jun. 22, 1982

[54] WINDMILL CONSTRUCTION

[76] Inventor: Joel M. Ross, R.R. #3, Salmon Arm, British Columbia, Canada, V0E 2T0

[21] Appl. No.: 211,891

[22] Filed: Dec. 1, 1980

[51] Int. Cl.³ .................................................. F03D 7/04
[52] U.S. Cl. ........................................ 416/88; 416/41; 416/23; 416/11
[58] Field of Search .................................... 416/87–89, 416/41 A, 14 D, 23–24, 11

[56] References Cited

U.S. PATENT DOCUMENTS

| | | | |
|---|---|---|---|
| 970,616 | 9/1910 | Edison | 416/87 |
| 1,757,667 | 5/1930 | Hesse | 416/89 A |
| 2,117,788 | 5/1938 | Cable et al. | 416/89 A |
| 2,403,899 | 7/1946 | Ammen | 416/87 X |
| 2,437,789 | 3/1948 | Robins | 416/88 X |
| 4,029,435 | 6/1977 | Barker | 416/89 X |

FOREIGN PATENT DOCUMENTS 252461 5/1926 United Kingdom .................. 416/88

*Primary Examiner*—Everette A. Powell, Jr.
*Attorney, Agent, or Firm*—Stanley G. Ade

[57] ABSTRACT

Opposing windmill airfoil blades extend from a central hub and are connected thereto by a pair of cables secured to the inner ends of the blades and which each freely engages through the opposite ends of a cross member secured to the hub. These cables then extend to a reel on the hub thus forming a triangular configuration to support each airfoil blade. The reel is driven by a small reversible electric motor which extends and retracts the cables and hence the blades depending upon the tension in the cables which is sensed by a sensor which in turn actuates the electric motor. As the wind speed increases in velocity, the cables lengthen and vice-versa. Guide vanes or control tail wings extend from adjacent the inner ends of each of the airfoil blades and are fixed in manufacture thus automatically presenting the desired angle of attack of the airfoil blades to the wind. The rigidity of the cables, due to centrifugal force, allows the rotation of the assembly to rotate the shaft extending from the hub which may drive a generator. Conventional yaw control means are provided to maintain the blades in the desired direction relative to the wind direction.

19 Claims, 6 Drawing Figures

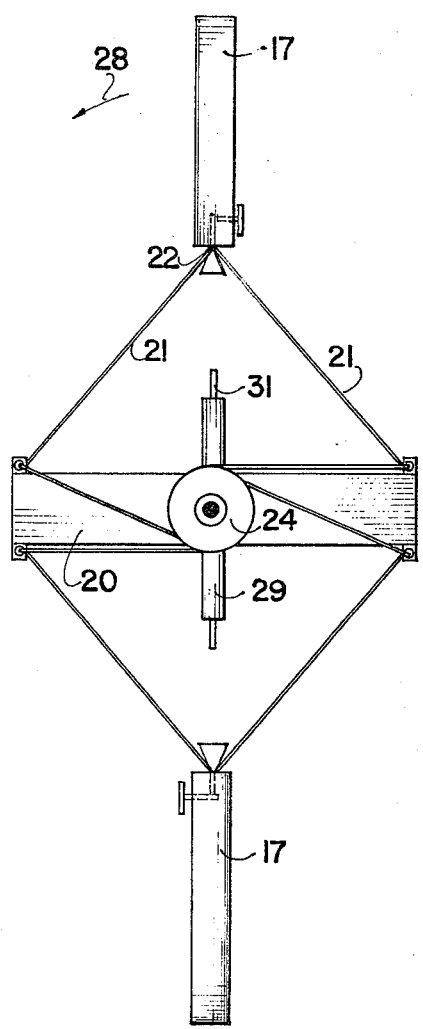
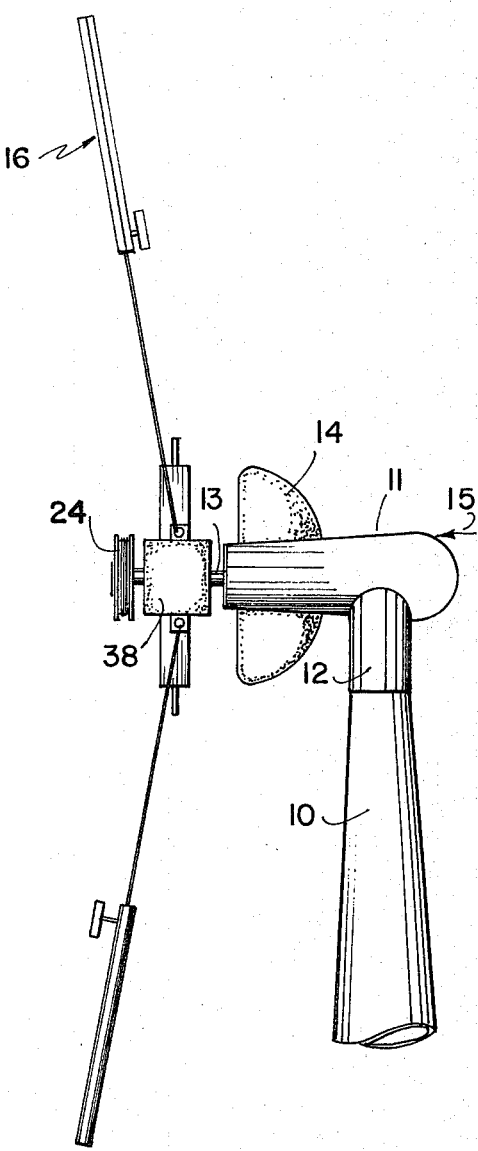
FIG. 1
FIG. 3

4,335,996

WINDMILL CONSTRUCTION

BACKGROUND OF THE INVENTION

This invention relates to new and useful improvements in windmill constructions and assemblies. Many attempts have been made to construct windmills which are more efficient than conventional windmills but they all suffer from one disadvantage namely that the diameter of the rotating portion of the windmill is fixed thus making it difficult to control the velocity of the windmill particularly when relatively strong winds are encountered.

SUMMARY OF THE INVENTION

The present invention overcomes these disadvantages by providing a windmill assembly in which the diameter of the effective blade area may be increased or decreased automatically depending upon the wind speed.

In accordance with the invention there is provided a windmill assembly comprising in combination a drive shaft, means supporting said drive shaft, a plurality of radially extending windmill airfoils and means extending from said shaft to support said airfoils symmetrically therearound, said means including a cable support member for each airfoil extending substantially at right angles to the longitudinal axis of said airfoil and upon either side thereof, and flexible cable means extending from said airfoil to said cable support members adjacent the distal ends thereof, and reel means for said flexible cable means adjacent said spindle, said flexible cable means running freely through said cable support members adjacent the distal end thereof and to said reel.

The principal object of this invention is to provide a means for a windmill to extract more power from the wind than is normal, for a given blade length and to maintain that power output during excessively high winds.

This is accomplished through the use of extendable and retractable airfoils which, when extended, present a greater working area to the wind and hence more power output and which can be extended even further as the wind speed increases.

This is accomplished through the use of extendable and retractable cables connected from the hub of the windmill to the airfoils so that the airfoils can be extended and retracted. The triangular arrangement of the cables and centrifugal force caused by the rotation of the airfoils, maintains the cables taut thereby in effect forming a rigid member whereby the torque of the airfoils can be transmitted to the hub. The airfoils also possess a unique feature in that they can constantly correct their own pitch without the need for additional cables or other control devices as is usually the case in airfoil designs.

Another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a partially schematic front elevation of the airfoil portion of the windmill in the operating position.

FIG. 3 is a side elevation of FIG. 1.

In the drawings like characters of reference indicate corresponding parts in the different figures.

DETAILED DESCRIPTION

Figure 2:
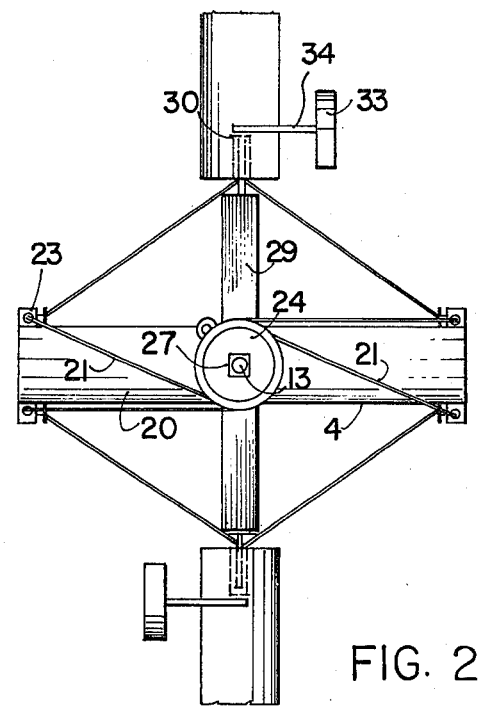
FIG. 2 is an enlarged fragmentary view of the centre portion of FIG. 1.
Figure 5:
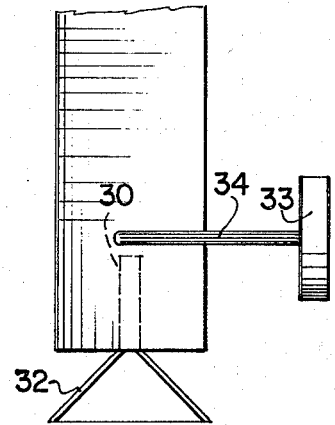
FIG. 5 is an enlarged fragmentary side elevation of the inner end of one of the airfoils.
Figure 4:
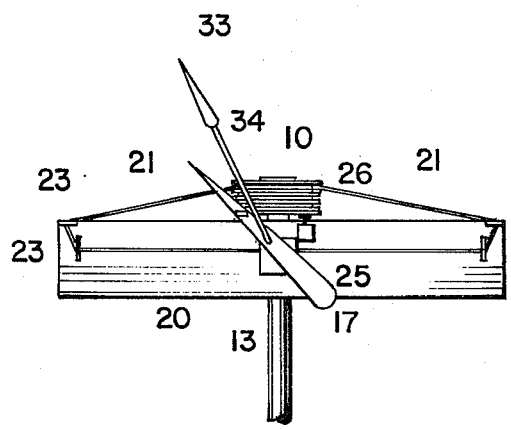
FIG. 4 is an enlarged fragmentary side elevation of the centre portion of FIG. 3.

Proceeding therefore to describe the invention in detail, supporting structure in the form of a tower 10 is provided with a streamlined generator casing 11 mounted for free rotation upon the upper end thereof by means of a bearing assembly 12. A conventional wind generator (not illustrated) is contained within the casing and connected to a drive shaft 13 extending from the rear end or downwind end of the casing. Vertically situated vanes 14 or the equivalent are provided on the casing to control the yaw of the device and to maintain the enlarged end of the casing into the wind which is shown blowing from the direction indicated by arrow 15.

In the present embodiment, a pair of airfoil blades collectively designated 16 are shown but of course other multiples can be provided always assuming that they are in opposed pairs.

Each airfoil comprises an elongated blade 17 having an airfoil configuration including a leading edge 18 and a trailing edge 19 as is conventional. A cable support bar or member 20 is secured to the shaft 13 and extends upon either side thereof substantially at right angles to the longitudinal axis of the airfoil blades 17. Flexible cable means 21 are provided mounting the airfoil blades to the support members 20 and it is preferred that this flexible cable includes a pair of cables secured by one end thereof to adjacent the inner end 22 of the airfoil blade and diverging outwardly to engage through apertures 23 formed in the outer ends of the cable support member 20. The two cables then extend inwardly and engage around a reel 24 in opposite directions as clearly shown in FIG. 2, so that rotation of the reel in a clockwise direction with reference to FIG. 2 will permit the cables to extend and anticlockwise rotation of the reel will cause the cables to retract.

A small electric motor 25 is connected to a source of power (not illustrated) and is operatively connected by means of gears 26, to the reel 24 with the motor 25 being reversible so that the reel can be rotated in either direction.

A sensor shown schematically by reference character 27 senses the tension within the cables 21 and may take the form of a strain gauge or other conventional tension sensor and this sensor is operatively connected to the electric motor 25 to extend or retract the cables 21 and hence extend or retract the airfoil blades 16 while same are rotating.

FIG. 1 shows the airfoil blades 17 in the operating position with the assembly rotating counterclockwise with reference to FIG. 1 as illustrated by arrow 28 at the ends of the taut cables 21. The airfoil blades 17 are maintained in the extended position by centrifugal force while being driven by the wind and are extended even more when the centrifugal force increases as will happen when the wind speed increases. Consequently cable tension is decreased and can be kept within allowable limits so that the windmill assembly can continue to operate during high winds. Similarly, the airfoil blades 17 are retracted as the wind speed and consequently the centrifugal force decreases again maintaining cable tension within allowable limits.

When in the fully retracted position shown in FIG. 2, the cables have been fully retracted and the inner ends 22 of the airfoil blades are supported upon air-foil support members 29 which extend from the spindle 13 at right angles to the cable support members 20 and in alignment with the longitudinal axis of the airfoil blades. A bore or drilling 30 is formed in the end of the airfoil blades and this is socketed onto a spindle 31 extending from the member 29. As the windmill slows down, the cables will retract as the centrifugal force and hence the tension reduces until the spindles 31 engage means such as a funnel shaped guide 32 extending from the inner end of the airfoil blades 17 surrounding the entrance to the drilling or aperture 30 thus guiding the inner end of the airfoil onto the spindle 31. This is only one method which may be provided depending upon design parameters.

Figure 6:
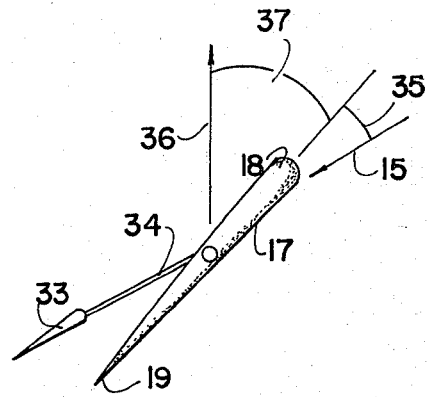
FIG. 6 is a partially schematic view showing the forces acting upon the airfoil and the direction thereof.

The mounting of the cables 21 to the inner ends 22 of the airfoil blades is such that the airfoil blades are freely rotatable around the longitudinal axis and this rotation is controlled by means of a tail wing or guide vane 33 situated on the distal end of a support strut or member 34 extending at an angle to the chord of the airfoil blade preferably adjacent the inner end thereof. The location of the tail wing 33 is preferably preset and is such that the angle of attack of the airfoil blades is optimum at all times. FIG. 6 shows the schematic view of the airfoil with the tail wing 33 in relation to the main airfoil blades 17. It maintains the airfoil blade pointed into the wind at a set angle 35 so that the main airfoil blades 17 provide a certain lifting force, the radial component 36 of which constitutes the driving force for the windmill assembly. Angle 35 between the tail wing 33 and the chord of the airfoil blades 17 can be varied during construction to produce predetermined and predesigned rotational speeds for the windmill. The smaller the angle, the faster the rotation.

The pitch of the main airfoil blades 17 shown as angle 37 varies with wind speed and rotational speed of the windmill which together constitute the apparent wind shown by arrow 15.

In operation, the airfoils are extended as wind speed increases or as rotational rate and consequently centrifugal force increases but just sufficient to keep cable tension within satisfactory limits, the limits being a necessity to keep the triangular configuration formed by the two taut cables 21 and the member 20, sufficiently rigid so as to maintain the airfoil blades 17 diametrically opposed for good balance and to allow the transmission of torque from the rotation of the airfoils, to the beam 20 and hence to the spindle 13 without distorting the triangular configuration.

As the wind speed drops, the airfoils are retracted to keep the cables 21 in a taut condition and as the wind subsides totally, they are mated to the support spindle 13 to take up the position shown in FIG. 2.

The power generated by the windmill should be limited so that it does not slow down the rotation of the windmill to a point where it is retracted unless the wind drops to a relatively low level as the most efficient generation of power is if the windmill assembly is fully extended.

It will be noted from FIG. 3, that when the windmill is in the operative position, the airfoils rotate in a plane slightly downwind from the plane of the hub 38 secured to spindle 13 and upon which the various components are mounted.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A windmill assembly comprising in combination a drive shaft, means supporting said drive shaft, a plurality of radially extending windmill airfoils and means extending from said shaft to support said airfoils symmetrically therearound, said means including a cable support member for each airfoil extending substantially at right angles to the longitudinal axis of said airfoil and upon either side thereof, and flexible cable means extending from said airfoil to said cable support members adjacent the distal ends thereof in a substantially one dimensional triangular configuration, and reel means for said flexible cable means adjacent said spindle, said flexible cable means running freely through said cable support members adjacent the distal end thereof and to said reel.

2. The invention according to claim 1 which includes means to sense the tension in said flexible cable means, a source of power for said reel, said means to sense the tension of said flexible cable means being operatively connected to said source of power for said reel thereby maintaining a predetermined tension within said flexible cable means, within limits.

3. The assembly according to claim 1 which includes a support member for each of said airfoils extending radially from said shaft in between each pair of cable support members, said airfoil being longitudinally apertured within the inner end thereof, said support members including a spindle extending from the distal ends thereof freely engaging within the apertures in the inner ends of said airfoil, when said airfoils are in the innermost position.

4. The invention according to claim 3 which includes means to sense the tension in said flexible cable means, a source of power for said reel, said means to sense the tension of said flexible cable means being operatively connected to said source of power for said reel thereby maintaining a predetermined tension within said flexible cable means, within limits.

5. The invention according to claim 1 which includes means on said assembly to control the yaw of said shaft and airfoils thereon whereby said airfoils are maintained in the desired relative relationship to the direction of the wind.

6. The invention according to claim 2 which includes means on said assembly to control the yaw of said shaft and airfoils thereon whereby said airfoils are maintained in the desired relative relationship to the direction of the wind.

7. The invention according to claim 3 which includes means on said assembly to control the yaw of said shaft and airfoils thereon whereby said airfoils are maintained in the desired relative relationship to the direction of the wind.

8. The invention according to claim 4 which includes means on said assembly to control the yaw of said shaft and airfoils thereon whereby said airfoils are maintained in the desired relative relationship to the direction of the wind.

9. The invention according to claim 1 which includes means extending from each of said airfoils to control the angle of attack of said airfoils relative to the wind, said last mentioned means including a support strut extending in trailing relationship from said airfoil and a tail wing secured upon the distal end of said support strut.

10. The invention according to claim 2 which includes means extending from each of said airfoils to control the angle of attack of said airfoils relative to the wind, said last mentioned means including a support strut extending in trailing relationship from said airfoil and a tail wing secured upon the distal end of said support strut.

11. The invention according to claim 3 which includes means extending from each of said airfoils to control the angle of attack of said airfoils relative to the wind, said last mentioned means including a support strut extending in trailing relationship from said airfoil and a tail wing secured upon the distal end of said support strut.

12. The invention according to claim 4 which includes means extending from each of said airfoils to control the angle of attack of said airfoils relative to the wind, said last mentioned means including a support strut extending in trailing relationship from said airfoil and a tail wing secured upon the distal end of said support strut.

13. The invention according to claim 5 which includes means extending from each of said airfoils to control the angle of attack of said airfoils relative to the wind, said last mentioned means including a support strut extending in trailing relationship from said airfoil and a tail wing secured upon the distal end of said support strut.

14. The invention according to claim 6 which includes means extending from each of said airfoils to control the angle of attack of said airfoils relative to the wind, said last mentioned means including a support strut extending in trailing relationship from said airfoil and a tail wing secured upon the distal end of said support strut.

15. The invention according to claim 7 which includes means extending from each of said airfoils to control the angle of attack of said airfoils relative to the wind, said last mentioned means including a support strut extending in trailing relationship from said airfoil and a tail wing secured upon the distal end of said support strut.

16. The invention according to claim 8 which includes means extending from each of said airfoils to control the angle of attack of said airfoils relative to the wind, said last mentioned means including a support strut extending in trailing relationship from said airfoil and a tail wing secured upon the distal end of said support strut.

17. The invention according to claims 9, 10 or 11 in which said support strut and said tail wing are situated adjacent the inner end of said airfoil.

18. The invention according to claims 12, 13 or 14 in which said support strut and said tail wing are situated adjacent the inner end of said airfoil.

19. The invention according to claims 15 or 16 in which said support strut and said tail wing are situated adjacent the inner end of said airfoil.

* * * * *